No. 682,859. Patented Sept. 17, 1901.
A. E. OVERTON.
ANTIFRICTION BEARING.
(Application filed Jan. 23, 1901.)

(No Model.)

WITNESSES:
Joseph H. Niles.
George O. Heibel.

INVENTOR
Alfred E. Overton,
BY Goepel & Wahle
ATTORNEYS.

THE NORRIS PETERS CO., PHOTO-LITHO., WASHINGTON, D. C.

UNITED STATES PATENT OFFICE.

ALFRED E. OVERTON, OF NEW YORK, N. Y.

ANTIFRICTION-BEARING.

SPECIFICATION forming part of Letters Patent No. 682,859, dated September 17, 1901.

Application filed January 23, 1901. Serial No. 44,406. (No model.)

*To all whom it may concern:*

Be it known that I, ALFRED E. OVERTON, a citizen of the United States, residing in New York, borough of Brooklyn, in the State of New York, have invented certain new and useful Improvements in Antifriction-Bearings, of which the following is a specification.

This invention relates to an improved antifriction-bearing for shafts, wheels, and the like; and the object of the invention is to provide a bearing in which the bearing-balls are separated, so as to be out of contact with each other during their axial rotation and during their orbital motion around the shaft, so that the wear of the balls is prevented and an effective antifriction-bearing obtained.

The invention consists of an antifriction-bearing which comprises a shaft having a journal, a series of balls in contact with said journal, a series of separating-disks in contact with said balls and retained by the same out of contact with the journal, and a casing surrounding said balls and disks and provided with cones and a raceway for the same, respectively, said cones bearing upon said balls and receiving the load and the periphery of said raceway being located beyond the normal circumferential line of said disks.

Figure 1:
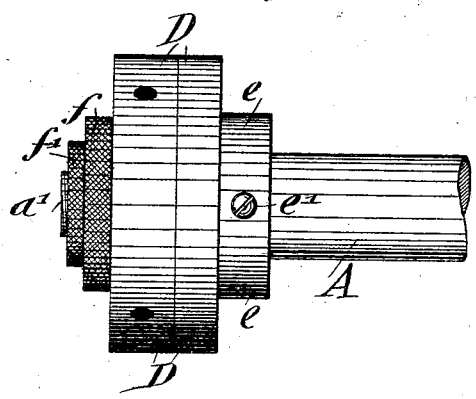
Figure 2:
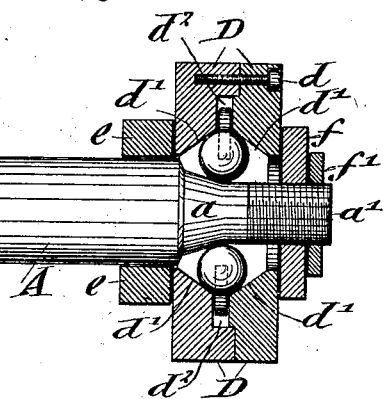
Figure 3:
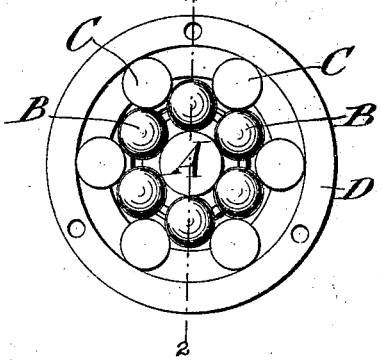
Figure 4:
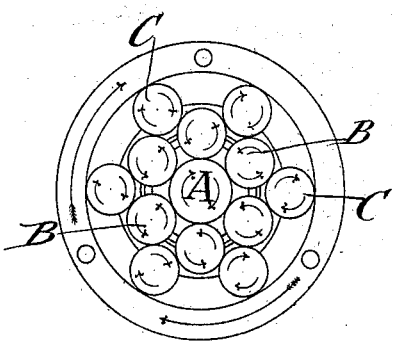

In the accompanying drawings, Figure 1 represents a side elevation of my improved antifriction-bearing. Fig. 2 is a vertical longitudinal section of the same on line 2 2, Fig. 3. Fig. 3 is an end elevation of the bearing with a portion of the casing removed, and Fig. 4 is a diagram showing the direction of axial and orbitary motion imparted to the bearing-balls and separating-disks from the shaft or casing.

Similar letters of reference indicate corresponding parts.

It may be stated that the underlying principle of my invention consists in the arrangement of a series of separating-disks between the adjacent bearing-balls, the raceways or cones of the balls and the raceway for the disks being located in the same casing, so that the axial motions which are imparted to the balls and disks take place in the same direction at their points of contact, thus avoiding the friction consequent upon the contact of bearing-balls with each other.

Referring to the drawings, A represents the shaft, which is provided at its end with a slightly-tapering journal-bearing $a$ and a threaded end $a'$. The journal-bearing and threaded end may be of smaller diameter than the body of the shaft.

Around the journal $a$ of the shaft A is arranged a series of bearing-balls B, which, however, do not rotate in contact with each other, but are held separated from each other by means of a series of outer disks C, which are interposed between the bearing-balls B and the casing D, that incloses both the bearing-balls and the separating-disks. The casing D is made of two segments, which are connected to each other by screws $d$ and provided at their inner tapering faces with raceways or cones $d'$ for the bearing-balls and with a raceway $d^2$, the center of which is in line with a plane passing through the centers of the bearing-balls and the centers of the separating-disks, as shown clearly in Fig. 2. The casing is held in place on the shaft by a collar $e$, that is attached to the shaft by a key $e'$ or otherwise, and by means of milled or knurled screw and jam nuts $f f'$, as shown in Figs. 1 and 2. The screw-nut $f$ and jam-nut $f'$ hold the antifriction-bearing in position on the journal of the shaft and permit also the screwing home of the casing and the rolling antifriction devices when the balls have been slightly reduced in diameter by long wear, so that they ride up along the inclined part of the journal and may be used after proper adjustment for a considerable length of time. The bearing-balls are prevented from forming contact with each other by the separating-disks, which are interposed between two adjacent balls. As the journal does not bear on the separating-disks, the unopposed rotary motion of the bearing-balls is permitted, and consequently the friction and wear which would take place at their points of contact are avoided. In the drawings the shaft, balls, disks, and periphery of the raceway are shown as in contact at all adjacent points; but the contact between the disks and their raceway is not a bearing contact, but simply a rolling contact, as the load is supported by the balls and cones and the disks and raceway do not bear the load. Like the bearing-balls, the separating-disks rest on and rotate on their own circumferences and are free to travel in either direction, according to the direction of motion of the bearing-balls. It will be noted that the bearing-balls have two motions—to wit, an axial and an orbital—and that both are in the same direction as that of the axial motion of the shaft or journal, thus avoiding conflict of motion and consequent friction. The separating-disks freely follow the movements of the bearing-balls which govern them.

Having thus described my invention, I claim as new and desire to secure by Letters Patent—

1. An antifriction-bearing, consisting of a shaft having a journal, a series of balls in contact with said journal, a series of separating-disks in contact with said balls, and retained by the same out of contact with the journal, and a casing surrounding said balls and disks, and provided with cones and a raceway for the same respectively, said cones bearing upon said balls and receiving the load, and the periphery of said raceway being located out of bearing contact with said disks, substantially as set forth.

2. An antifriction-bearing, consisting of a shaft having a journal, a series of balls in contact with said journal, a series of separating-disks in contact with said balls, and retained by the same out of contact with the journal, a casing surrounding said balls and disks, and provided with cones and a raceway for the same respectively, said cones bearing upon said balls and receiving the load, and the periphery of said raceway being located out of bearing contact with said disks, and means for adjusting said casing, balls and disks on the shaft, substantially as set forth.

In testimony that I claim the foregoing as my invention I have signed my name in presence of two subscribing witnesses.

ALFRED E. OVERTON.

Witnesses:
JOSEPH H. NILES,
PAUL GOEPEL.